(12) United States Patent
Sorkin et al.

(10) Patent No.: US 12,381,431 B2
(45) Date of Patent: Aug. 5, 2025

(54) GENERATOR COMMON CORE WINDING

(71) Applicant: SAFRAN POWER USA, LLC, Twinsburg, OH (US)

(72) Inventors: Lev Sorkin, Twinsburg, OH (US); Matthew Thomas Burger, Twinsburg, OH (US); Sara Roggia, Twinsburg, OH (US); Sergey Mischuk, Twinsburg, OH (US)

(73) Assignee: SAFRAN POWER USA, LLC, Twinsburg, OH (US)

( * ) Notice: Subject to any disclaimer, the term of this patent is extended or adjusted under 35 U.S.C. 154(b) by 139 days.

(21) Appl. No.: 17/922,898

(22) PCT Filed: May 6, 2020

(86) PCT No.: PCT/US2020/031676
§ 371 (c)(1),
(2) Date: Nov. 2, 2022

(87) PCT Pub. No.: WO2021/225592
PCT Pub. Date: Nov. 11, 2021

(65) Prior Publication Data
US 2023/0170753 A1    Jun. 1, 2023

(51) Int. Cl.
*H02K 3/28* (2006.01)
*H02K 1/16* (2006.01)
*H02K 19/34* (2006.01)

(52) U.S. Cl.
CPC ............... *H02K 3/28* (2013.01); *H02K 1/16* (2013.01); *H02K 19/34* (2013.01)

(58) Field of Classification Search
CPC ............ H02K 3/28; H02K 3/50; H02K 3/505; H02K 1/16; H02K 1/165; H02K 19/26; H02K 19/34
(Continued)

(56) References Cited

U.S. PATENT DOCUMENTS 6,940,202 B1    9/2005 Chen et al.
9,985,562 B1 *  5/2018 Rozman ................. H02K 3/28
(Continued)

FOREIGN PATENT DOCUMENTS

EP    2528199 A1    11/2012

OTHER PUBLICATIONS

International Search Report and Written Opinion, International Application No. PCT/US2020/031676 dated Feb. 9, 2021, 13 pages.

*Primary Examiner* — Michael Andrews
(74) *Attorney, Agent, or Firm* — Kilpatrick Townsend & Stockton LLP

(57) ABSTRACT

A variable frequency generator (VFG) may include a housing, a shaft, a rotor, and a stator with slots. The VFG also includes a first set of stator windings including a first subset of windings and a second subset of windings and a second set of stator windings including a first subset of windings and a second subset of windings. The windings of the first subset of the first set of stator windings are co-located with the windings of the first subset of the second set of stator windings so as to share a common slot of the plurality of slots of the stator. Further, the windings of the second subset of the first set of stator windings are co-located with the windings of the second subset of the second set of stator windings so as to share a common alternative slot of the plurality of slots of the stator.

20 Claims, 11 Drawing Sheets

(58) Field of Classification Search
USPC .......................................................... 310/184
See application file for complete search history.

(56) References Cited

U.S. PATENT DOCUMENTS

| | | | |
|---|---|---|---|
| 2008/0103632 A1* | 5/2008 | Saban | H02P 29/50 310/156.01 |
| 2012/0274171 A1* | 11/2012 | Ishikawa | H02K 3/12 310/198 |
| 2015/0042196 A1 | 2/2015 | Awazu et al. | |
| 2021/0218390 A1* | 7/2021 | Kuznetsov | H03K 3/57 |

* cited by examiner

GENERATOR COMMON CORE WINDING

BACKGROUND

Current generator topologies tend to have individual phases routed through a given stator slot of a machine. The DC-Link based variable speed constant frequency (VSCF) converters predominately employ two power source topologies: six phase generators or three-phase generators with a Delta-Wye transformer that produces six phases. Both topologies produce six phases that are rectified to supply the converter direct current (DC) links. Three-phases are rectified to supply the positive DC link rail voltage, while the other three rectified phases supply power to the negative DC rail. Such configuration provides a simple generator winding scheme.

For example, a 3-phase generator in combination with a transformer system may require more volume and weigh more than the 6-phase generating system. The 6-phase generator system is lighter than the 3-phase VSCF system. However, both topologies are based on a 6-pulse rectification (3-phase rectifier) for each DC-Link rail; thus producing substantial current and voltage ripple on the DC-Link. To reduce the ripple, a large capacitor bank is utilized. This DC-Link ripple may be passed to the generator creating a torque ripple. The torque ripple may negatively affect the reliability of the engine gearbox and the generator bearings.

BRIEF DESCRIPTION

According to one aspect, a variable frequency generator (VFG) may include a housing and a shaft rotationally received in the housing. The shaft defines a rotational axis. The VFG also includes a rotor disposed on the shaft so as to be rotationally linked to the shaft and a stator located in the housing so as to at least partially surround the rotor and remain stationary with respect to the housing. The stator defines a plurality of slots that are radially aligned with the rotational axis of the shaft. The VFG also includes a first set of stator windings including a first subset of windings and a second subset of windings and a second set of stator windings including a first subset of windings and a second subset of windings. The second set of stator windings are distinct from the first set of stator windings. At least some of the windings of the first subset of the first set of stator windings are co-located with at least some of the windings of the first subset of the second set of stator windings so as to share a common slot of the plurality of slots of the stator. Further, at least some of the windings of the second subset of the first set of stator windings are co-located with at least some of the windings of the second subset of the second set of stator windings so as to share a common alternative slot of the plurality of slots of the stator.

Current of the windings associated with the first subset of the first set of stator windings and windings associated with the first subset of the second set of stator windings may flow with a first phase shift. Current of the windings associated with the second subset of the first set of stator windings and windings associated with the second subset of the second set of stator windings may flow with a second phase shift that is different from the first phase shift. The first set of stator windings may be a set of three-phase windings and the second set of stator windings may be a set of three-phase windings.

The first set of stator windings may be in a star configuration and the second set of stator windings may be in the star configuration. Windings associated with the first subset of the first set of stator windings may be associated with outer portions of the plurality of slots of the stator. Windings associated with the first subset of the second set of stator windings may be associated with inner portions of the plurality of slots of the stator. A phase of the first set of stator windings may be shifted by at least 90 electrical degrees.

According to one aspect, a variable frequency generator (VFG) may include a housing and a shaft rotationally received in the housing. The shaft defines a rotational axis. The VFG may also include a rotor disposed on the shaft so as to be rotationally linked to the shaft a stator at least partially surrounding the shaft that defines a plurality of slots. The VFG may also include a first set of stator windings including a first subset and a second subset and a second set of stator windings including a first subset and a second subset.

The windings of the first subset of the first set of stator windings share a common slot of the plurality of slots of the stator with the windings of the first subset of the second set of stator windings and the windings of the second subset of the first set of stator windings share a common alternative slot of the plurality of slots of the stator with the windings of the second subset of the second set of stator windings. Additionally, current of the windings of the first subset of the first set of stator windings and the windings of the first subset of the second set of stator windings flows with a first phase shift and current of the windings of the second subset of the first set of stator windings and the windings of the second subset of the second set of stator windings flows with a second phase shift that is different from the first phase shift.

The first set of stator windings may be a set of three-phase windings and the second set of stator windings may be a set of three-phase windings. The first set of stator windings may be in a star configuration and the second set of stator windings may be in the star configuration. Windings associated with the first subset of the first set of stator windings may be associated with outer portions of the plurality of slots of the stator. Windings associated with the first subset of the second set of stator windings may be associated with inner portions of the plurality of slots of the stator. A phase of the first set of stator windings may be shifted by at least 90 electrical degrees.

According to one aspect, a variable frequency generator (VFG) may include a housing and a shaft rotationally received in the housing. The shaft defines a rotational axis. The VFG may also include a rotor disposed on the shaft and a stator located in the housing so as to at least partially surround the rotor. The stator defines a plurality of slots. The VFG may also include a first set of stator windings including a first subset and a second subset and a second set of stator windings including a first subset and a second subset.

The windings of the first subset of the first set of stator windings share common slots of the plurality of slot of the stator with the windings of the first subset of the second set of stator windings. Further, the windings of the second subset of the first set of stator windings share common alternative slots with the windings of the second subset of the second set of stator windings. The windings of the first subset of the first set of stator windings are disposed in radially outer portions of the plurality of slots of the stator with respect to the windings of the first subset of the first set of stator windings.

Current of the windings associated with the first subset of the first set of stator windings and windings associated with the first subset of the second set of stator windings may flow with a first phase shift. Current of the windings associated with the second subset of the first set of stator windings and windings associated with the second subset of the second set of stator windings may flow with a second phase shift that is different than t first phase shift. The first set of stator windings may be a set of three-phase windings and the second set of stator windings may be a set of three-phase windings. The first set of stator windings may be in a star configuration and the second set of stator windings may be in the star configuration.

Windings associated with the first subset of the second set of stator windings may be associated with outer portions of the plurality of slots of the stator. Windings associated with the first subset of the second set of stator windings may be associated with inner portions of the plurality of slots of the stator. A phase of the first set of stator windings may be shifted by at least 90 electrical degrees.

DETAILED DESCRIPTION

Current generator topologies have individual phases routed through a different stator slots of a machine so that there is no colocation of the windings of the phases. However, by winding two phases within a given core slot, one can achieve an equivalent power with less maximum flux required, thus reducing the size and weight of the machine. According to one aspect, a core flux reduction through co-located phase shifted windings in an n-phase VSCF generating system may be provided.

Through having different phases share a common generator stator slot, the size and weight of the machine can be reduced for a given power level compared to a machine where each phase contains an individual phase winding. For example, by employing a 12-phase generator (i.e., 6-phases per DC-Link rail), the DC-Link ripple can be drastically reduced, thus less filtering of the DC-Link may be required and the system may produce a negligible torque ripple.

By co-locating multiple phase windings within the same stator slots, the torque quality of the machine can be increased and the output harmonic voltage content decreased.

According to one aspect, minimization of the differential voltage ripple of a 6-phase or 12-phase DC generator may be provided by the co-located windings of the common generator stator slot. For example, a 6-phase generator using a rectified six pulse load may reduce the differential voltage for a given load current and reduce the output harmonic content of the torque of the machine and therefore increase the machine efficiency and available output power.

Additionally, the maximum magnetic flux through the stator core may be reduced since the machine may utilize the differential flux between the phases feeding the positive and the phases feeding the negative DC-Link rails. Since torque in the machine is a product of the phase currents, this arrangement of phase windings further reduces electromagnetic torque ripple on the generator shaft.

Figure 1:
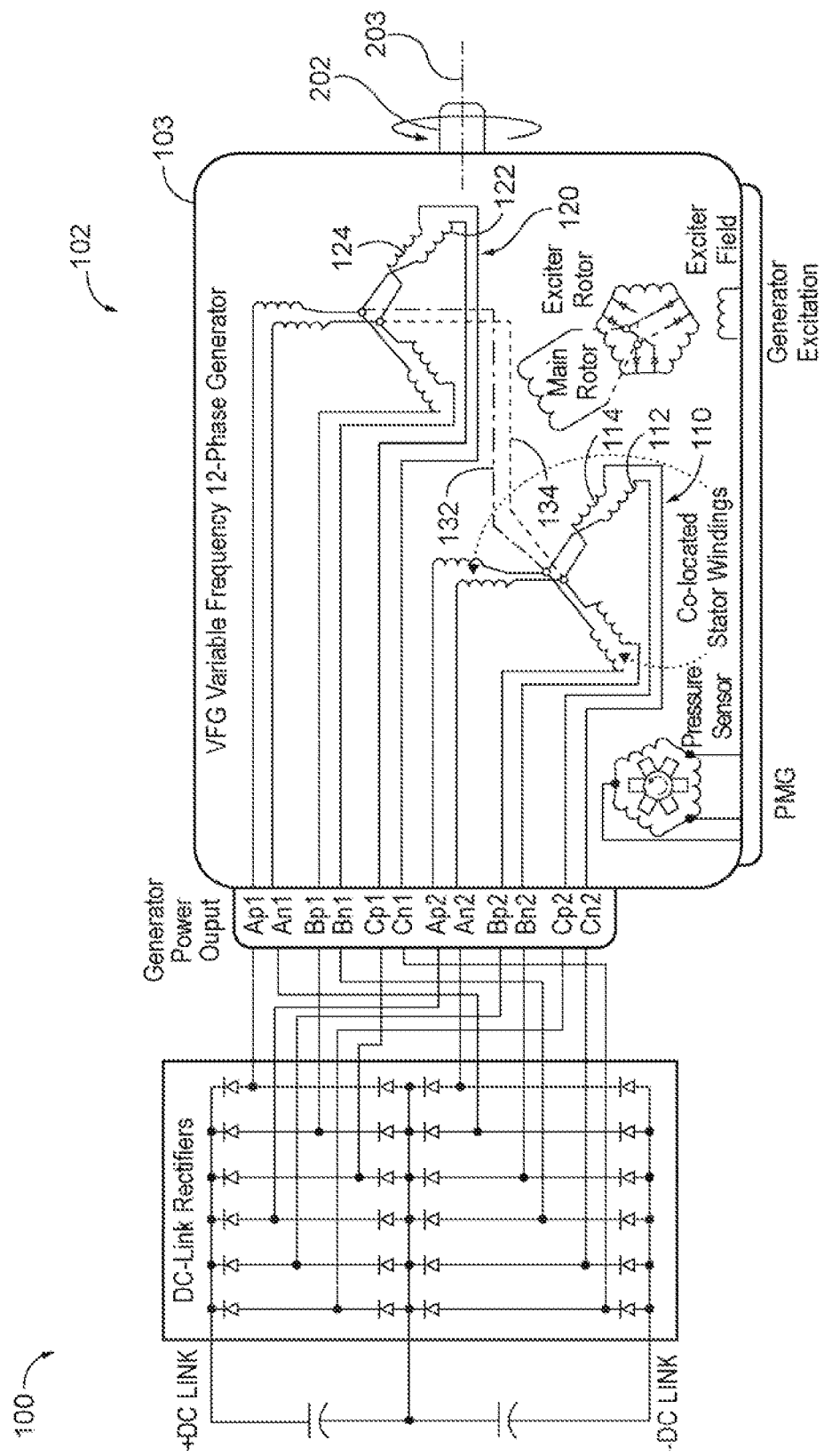
FIG. 1 is an exemplary component diagram of a variable frequency generator (VFG), according to one aspect.

FIG. 1 is an exemplary component diagram of system 100 including a variable frequency generator (VFG 102), according to one aspect. The VFG 102 of FIG. 1 may produce 12 phases, for example. The 12 phases may be rectified, thereby creating a +/− direct current (DC) link. This +/− DC link may be checked to produce an output voltage. As seen in FIG. 1, a first set 110 of stator windings may include a first subset 112 and a second subset 114. Additionally, a second set 120 of stator windings may include a first subset 122 and a second subset 124.

The first subset 112 of the first set 110 of stator windings may share a common point 132 or electrical connection with the first subset 122 of the second set 120 of stator windings. The second subset 114 of the first set 110 of stator windings may share a common point 134 or electrical connection with the second subset 124 of the second set 120 of stator windings. As will be described in more detail hereinafter, windings of the first subset 112 of the first set 110 of stator windings can be co-located with windings of the first subset 122 of the second set 120 of stator windings in the same common slot of the stator and windings of the second subset 114 of the first set 110 of stator windings can be co-located with windings of the second subset 124 of the second set 120 of stator windings in a common alternative slot of the stator.

According to one aspect, one of the subsets may produce a negative DC link, while the other subset may produce a positive DC link. For example, the first subset 112 for the first set 110 of stator windings and the first subset 122 for the second set 120 of stator windings may produce the negative DC link while the second subset 114 for the first set 110 of stator windings and the second subset 124 for the second set 120 of stator windings may produce the positive DC link.

According to one aspect, the first subset 112 for the first set 110 of stator windings and the first subset 122 for the second set 120 of stator windings may be associated with 6 phases, while the second subset 114 for the first set 110 of stator windings and the second subset 124 for the second set 120 of stator windings may be associated with 6 phases, for a total of 12 phases. However, additional or fewer phases may be implemented as desired. In this way, a synchronous wound rotor salient pole machine with multiple phase windings co-located in the same stator slot for more efficient flux sharing may be provided.

A power control unit (PCU) may receive 12 phases of input power from the VFG 102. As will be appreciated, the PCU can be of known construction. One 6-phase group may be used to produce the positive DC-link voltage and another 6-phase group may be used to produce the negative DC-link voltage. Both DC-link buses (e.g., positive and negative) have a main ripple component which may be thrice the output fundamental frequency (i.e., 1200 Hz for a 400 Hz output).

Since the change in power consumption from the positive and negative DC-link voltages are the cause for the ripple, an ability to keep the instantaneous sum of the powers taken from both DC-links as constant as possible, will result in a better balanced generator. Such improvement can be achieved by a specific generator stator slot colocation of the phases sourcing the positive DC-link with the phases sourcing the negative DC-link.

Figure 2A:
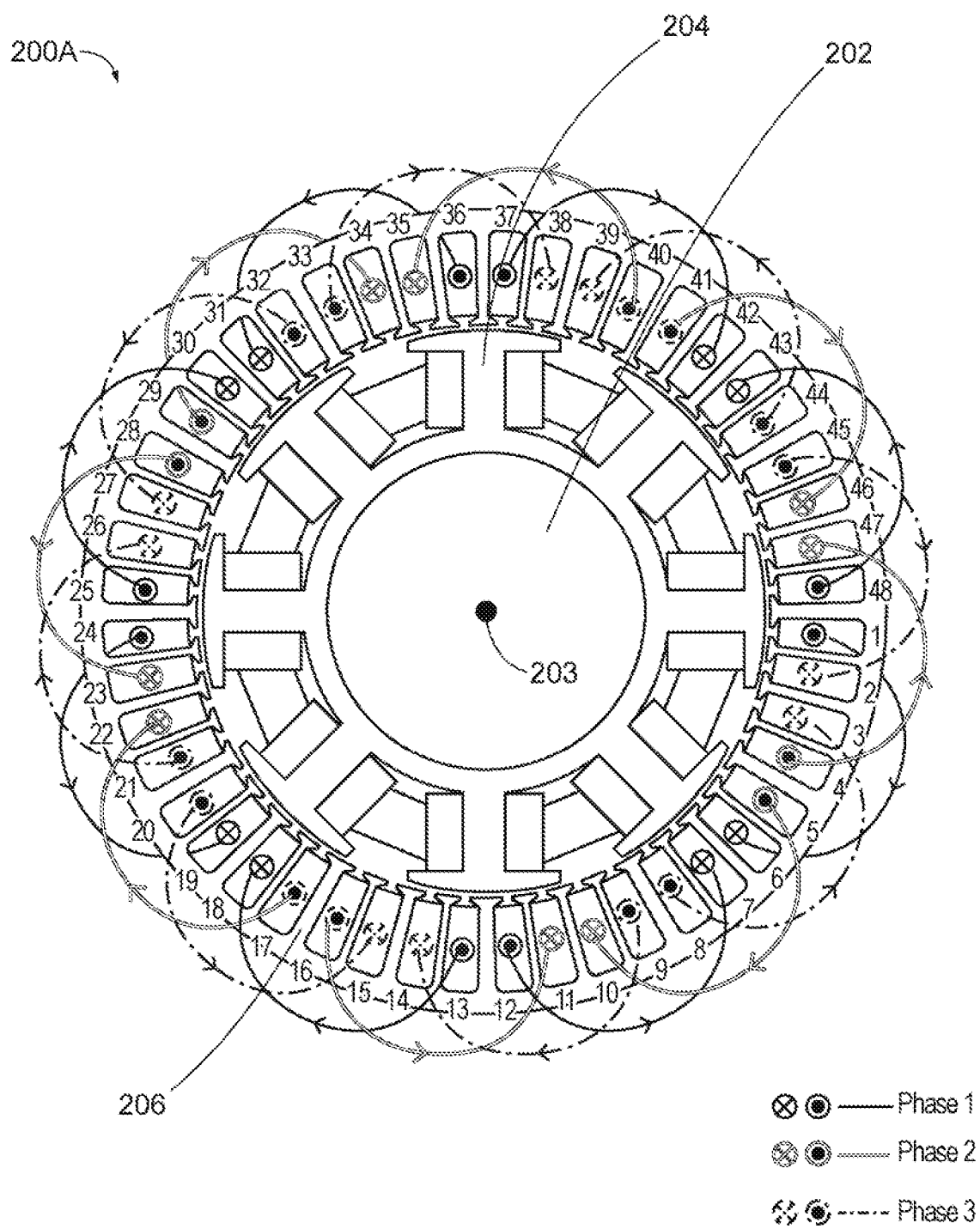
FIG. 2A-2B is an exemplary structural diagram of a variable frequency generator (VFG), according to one aspect.

FIG. 2A illustrates the internal components 200A of a 48 slot 4-pole six-phase generator, according to one aspect. The three-phase wound rotor synchronous machine has been re-wounded using three additional co-located windings and thus, a 6-phase generator is obtained.

Figure 2B:
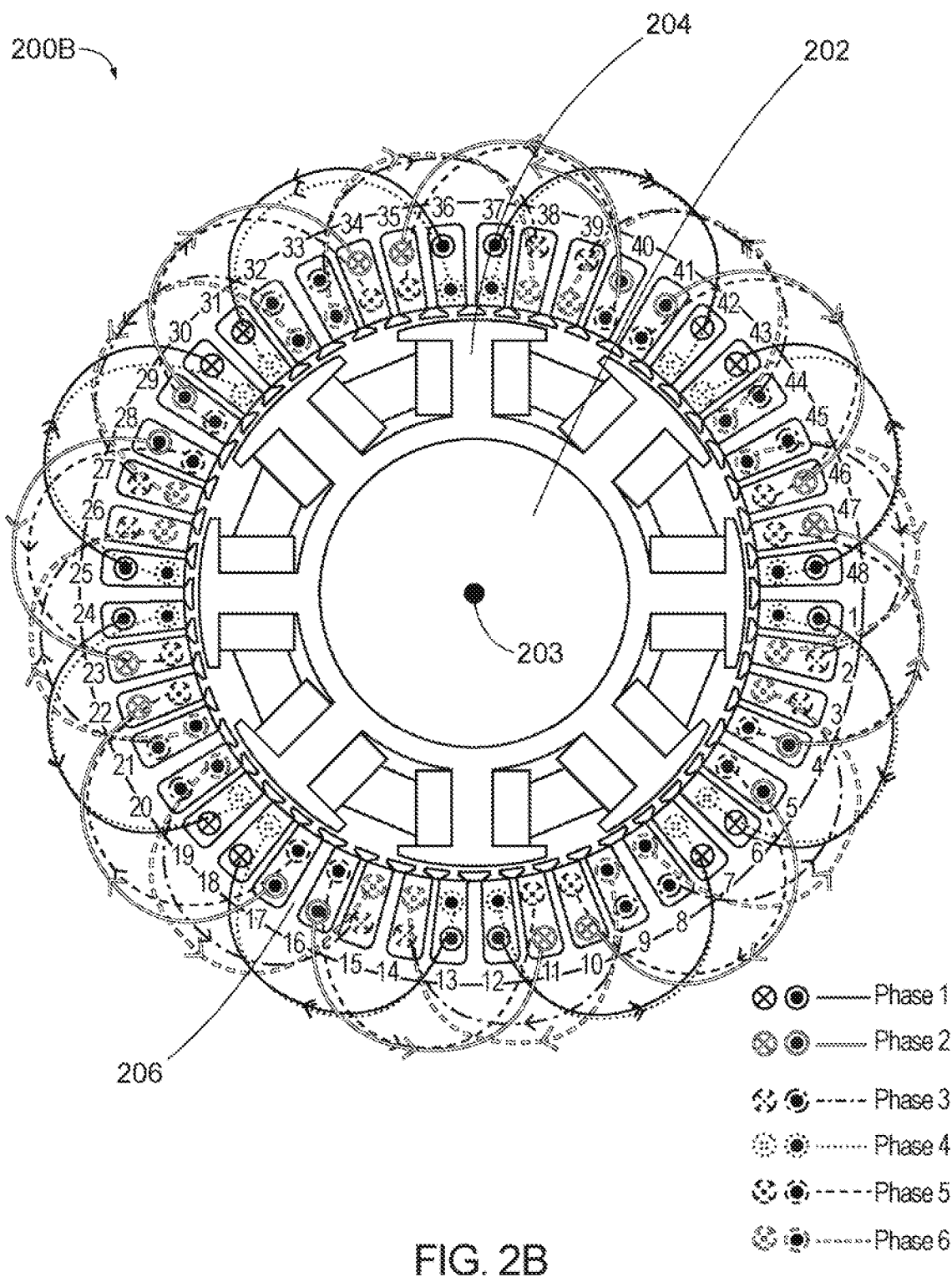
Figure 3A:
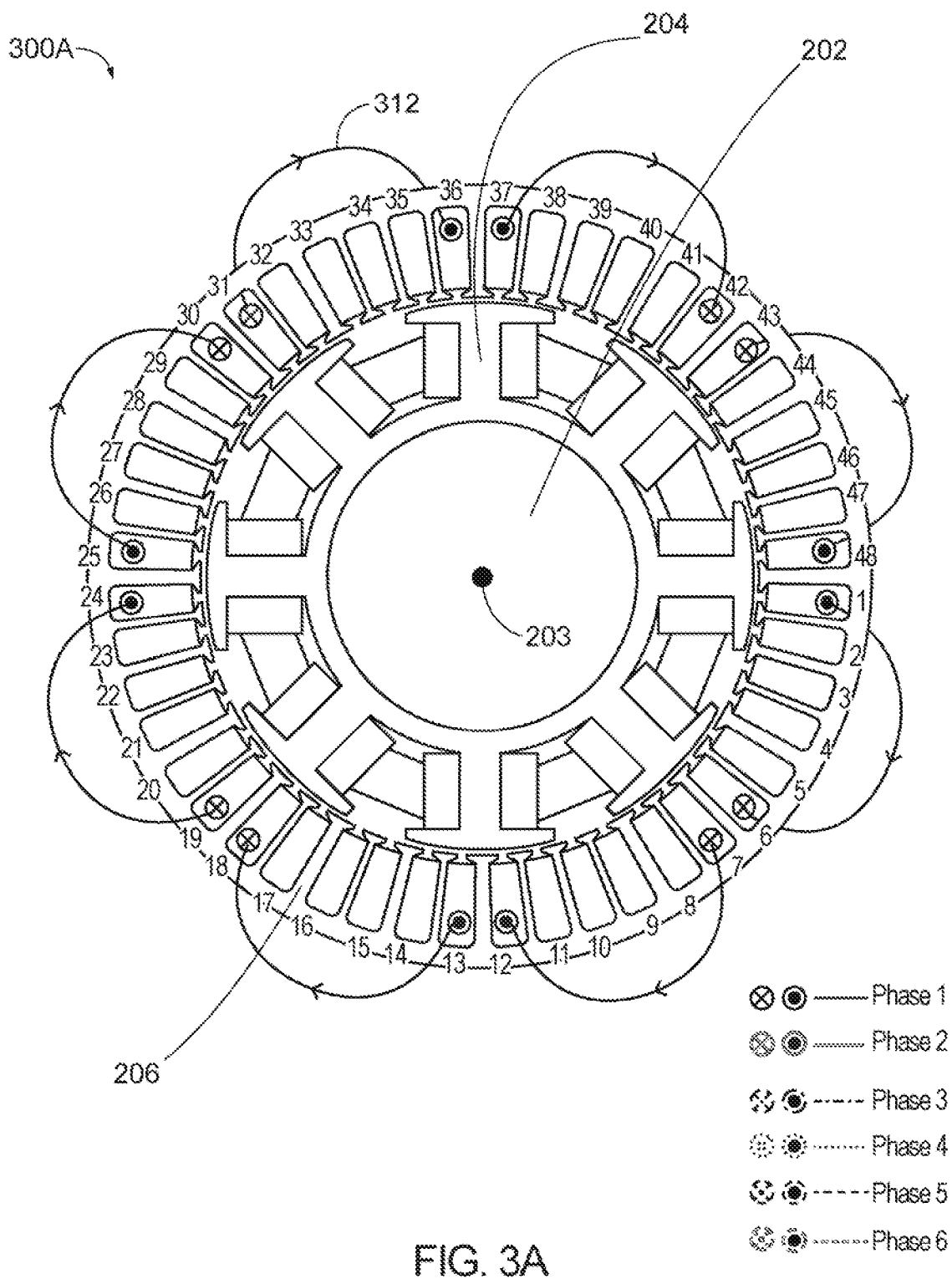
FIG. 3A-3B is an exemplary structural diagram of a variable frequency generator (VFG), according to one aspect.
Figure 3B:
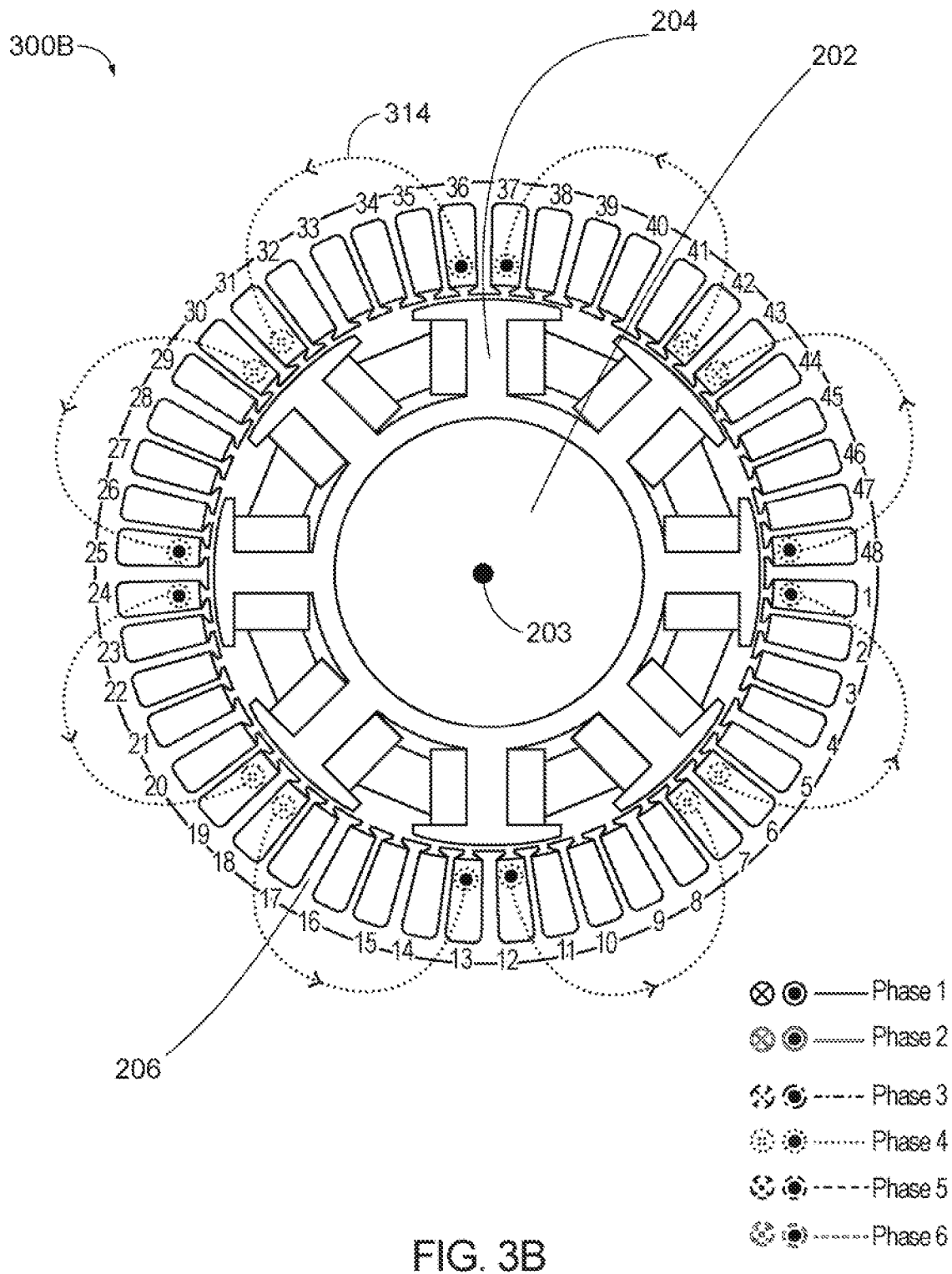
Figure 4A:
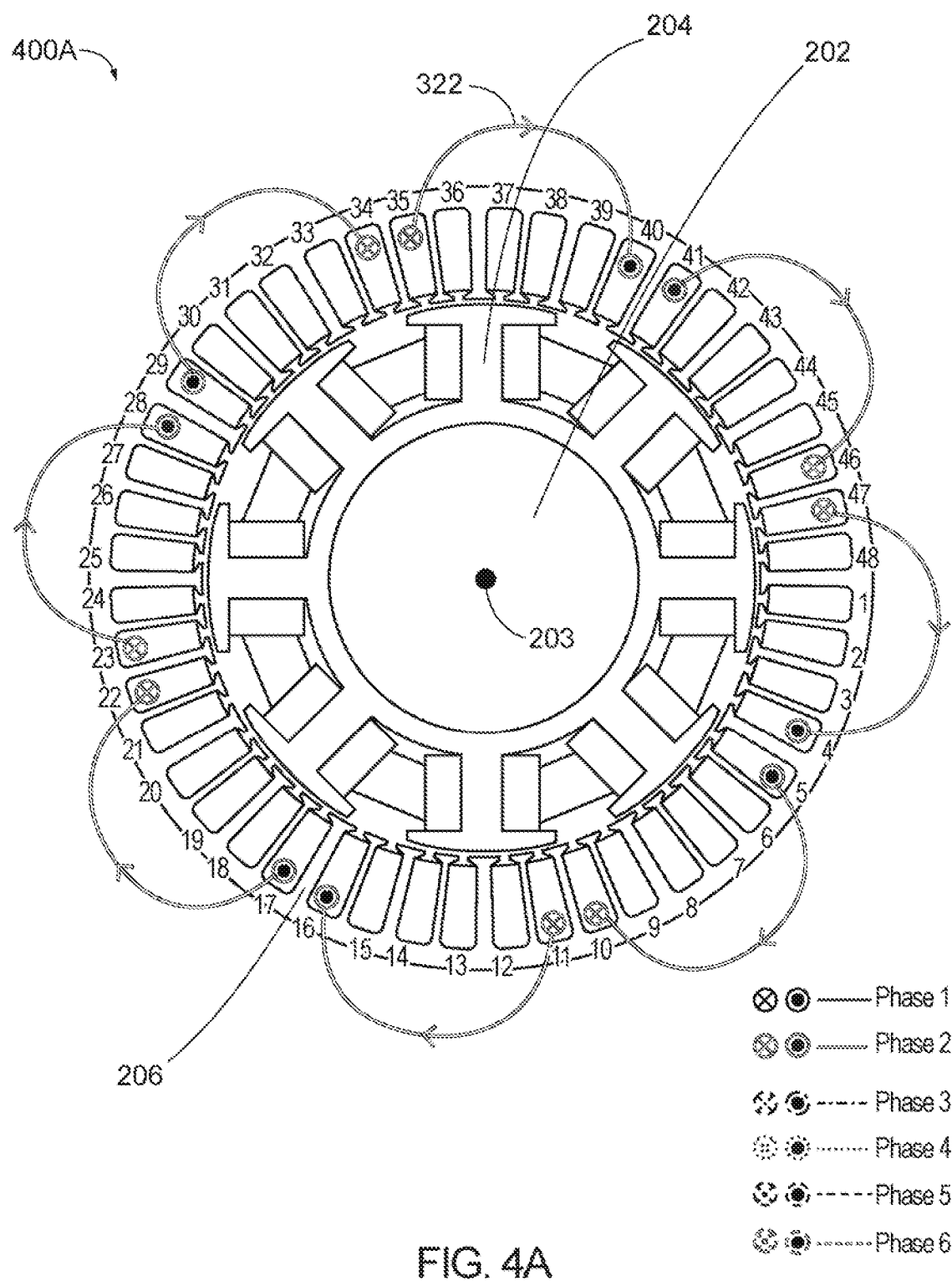
FIG. 4A-4B is an exemplary structural diagram of a variable frequency generator (VFG), according to one aspect.
Figure 4B:
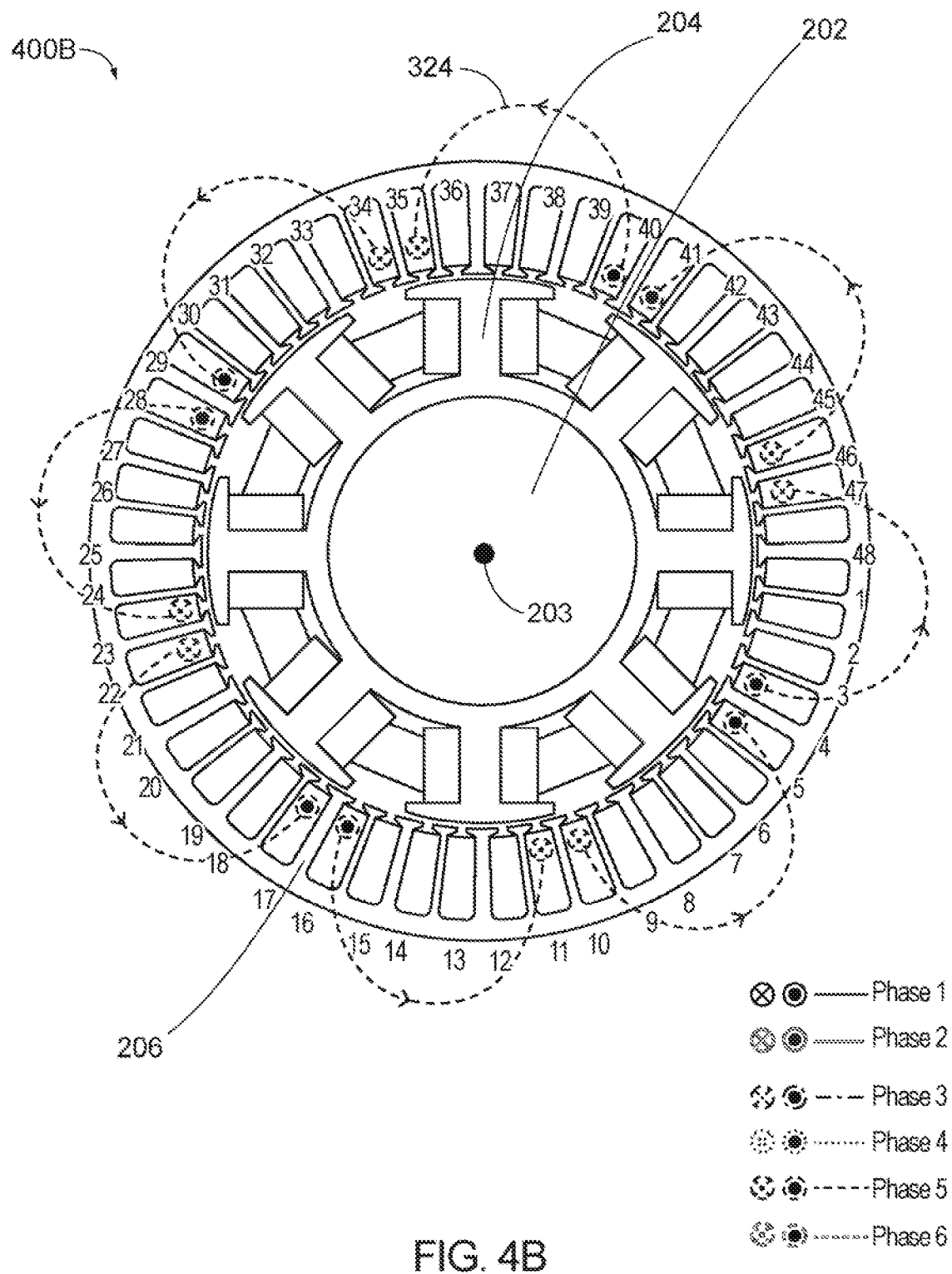
Figure 5A:
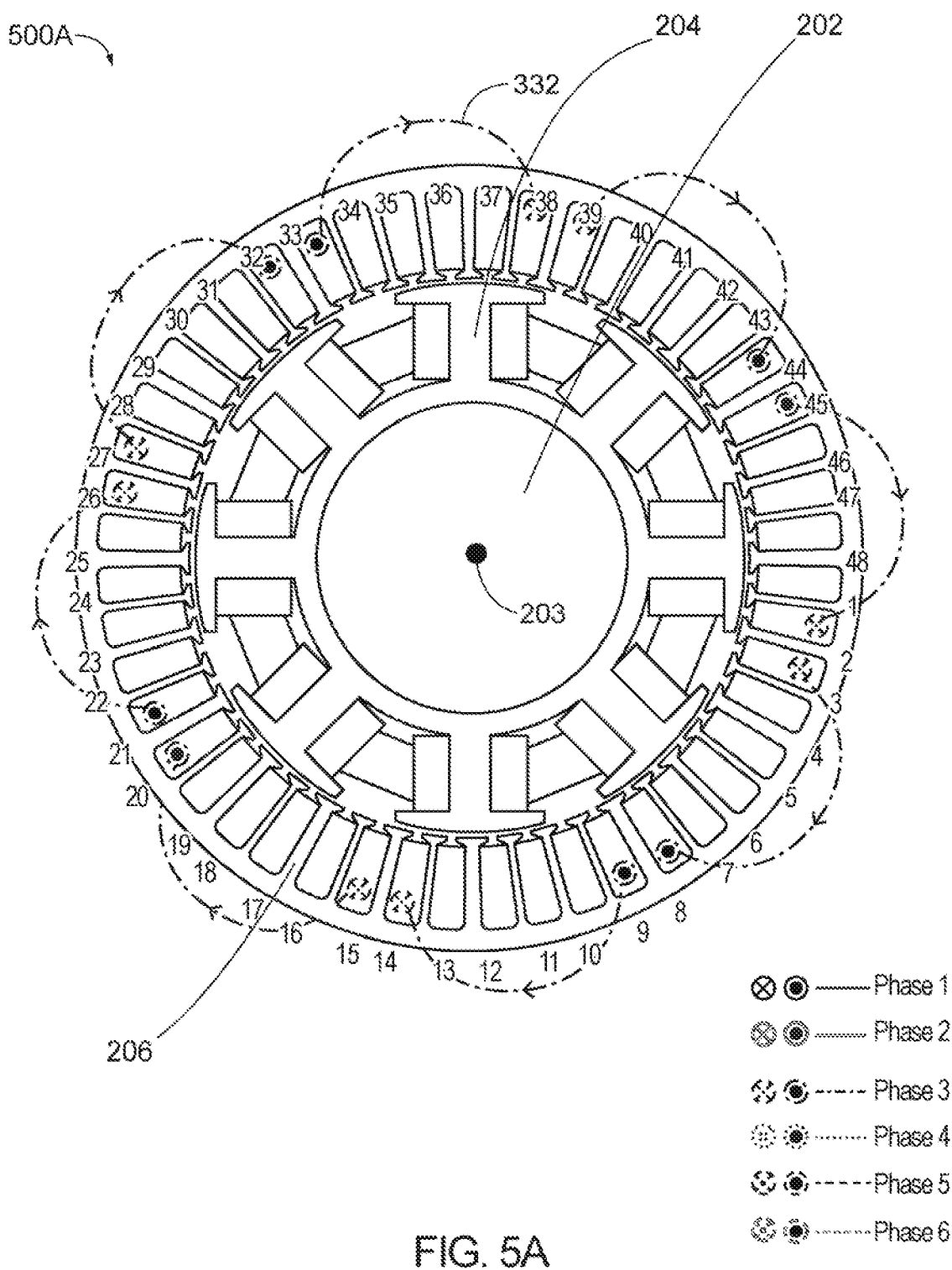
FIG. 5A-5B is an exemplary structural diagram of a variable frequency generator (VFG), according to one aspect.
Figure 5B:
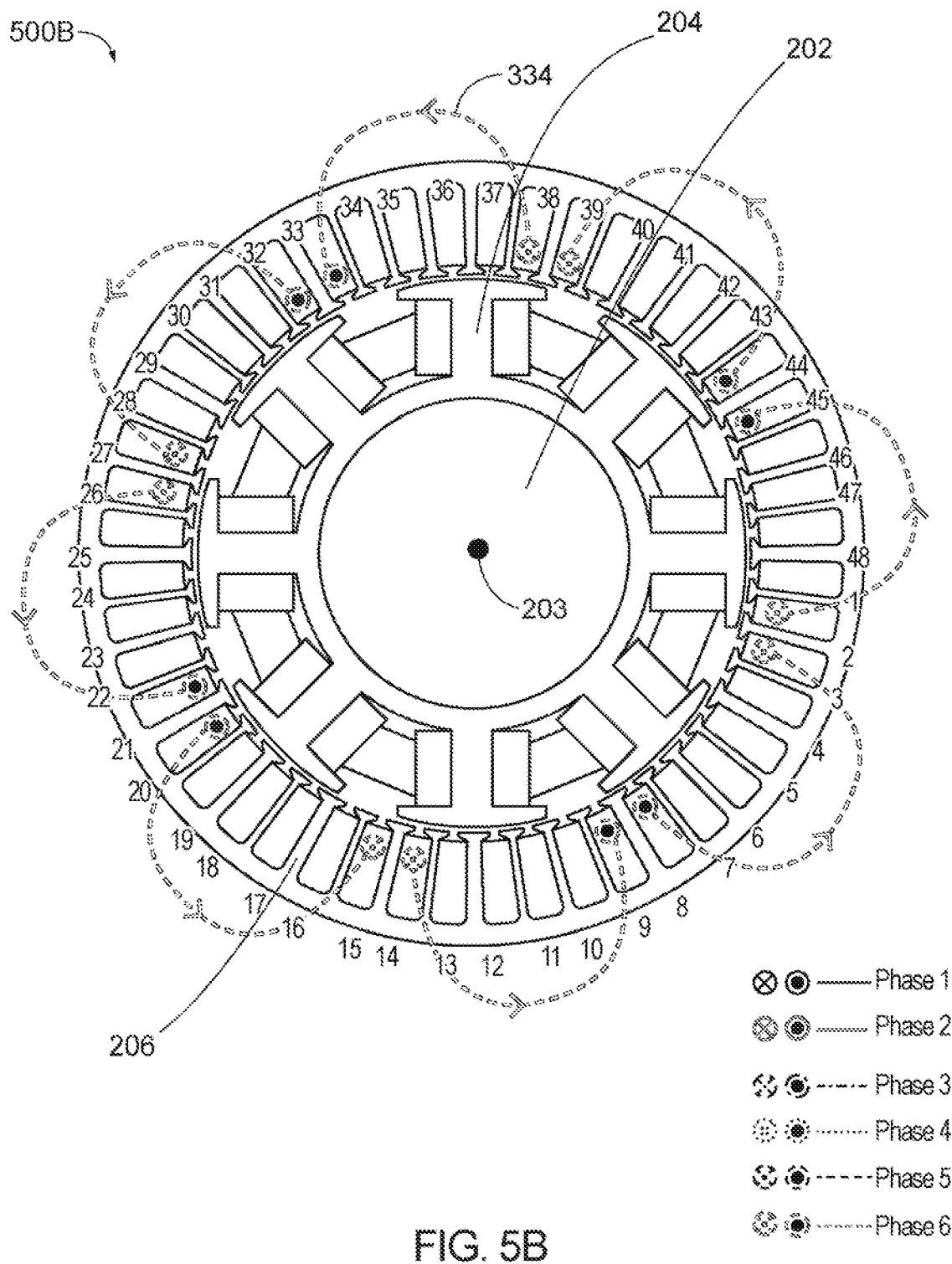

In contrast, FIG. 2B illustrates the internal components 200B of the six-phase generator with co-located windings, as schematically shown in FIG. 1. FIGS. 3A and 3B illustrate the internal components 300A, 300B of phase 1 and phase 4 belonging to stars S1 and S2, respectively, of the generator of FIG. 1. FIGS. 4A-4B illustrate the internal components 400A, 400B of phase 2 and phase 5 belonging to S1 and S2, respectively, of the generator of FIG. 1. Further, FIGS. 5A and 5B illustrate the internal components 500a, 500B of phase 3 and phase 6 belonging to S1 and S2, respectively, of the generator of FIG. 1.

With continued attention to FIGS. 2B-5B, as noted herein, the internal components of the generator 102 of FIG. 1 are shown. Unless otherwise noted, the elements shown in FIGS. 2B-5B are the same. Thus, for brevity, the description of like components will not be repeated. As shown in FIG. 1, the generator 102 includes a housing 103 that can be made of any number of materials that provide sufficient strength and durability to contain the components of the generator.

With reference to FIGS. 2B-5B, the internal components 200A-500B of the generator or VFG 102 can include a shaft 202 that defines a rotational axis 203, a rotor 204, and a stator 206. The shaft 202, rotor 204, and stator 206 can each have a generally circular outer diameter. Thus, it will be understood that FIGS. 2A-5B are cross-sectional views of the generator 102 so that the shaft 202 would be primarily extending in a direction orthogonal to the page. The shaft 202 is rotationally received in the housing 103. As will be appreciated, the stator 206 remains stationary with respect to the housing 103 and the shaft 202. Further, the shaft 202 and rotor 204 can be rotationally joined or linked together so as to rotate together as a solitary item.

As illustrated, the shaft 202 and the rotor 204 are coaxially disposed within the stator 206 so as to define an air gap between the rotor 204 and the stator 206, and more particularly, between the outer diameter of the rotor 204 and the inner diameter of the stator 206. It is noted that this air gap is not significant, so it may not be readily apparent from the figures. The shaft 202 and rotor 204 can be of known materials and construction.

The stator 206 can be made of any number of materials, including for example, steel, and can have an insulating resin or epoxy applied thereon. The stator 206 is located in the housing 103 so as to at least partially surround the rotor 204 and remain stationary with respect to the housing 103. The stator 206 defines a plurality of slots 1-48 that radially extend for receipt of windings 110, 120 as will be discussed in more detail hereinafter. The slots 1-48 can be radially aligned with the rotational axis 203 of the shaft 202.

As shown in FIGS. 2B-5B, the stator 206 can include 48 slots. For clarity, each of the slots of the stator 206 is numbered in the figures as 1 through 48. However, it will be understood that the starting and stopping point with respect to the numbering of these slots is not critical, but rather one of convenience for explanation purposes. It is envisioned that more or less slots is possible without departing from the scope of this disclosure. Each of the slots may be sized so as to receive two windings, according to one aspect.

As such, the generator of FIGS. 2B-5B is a six-phase machine 102 with co-located windings that has two sets of three-phase windings. Thus, the first set 110 of stator windings may be a set of three-phase windings and the second set 120 of stator windings may be a set of three-phase windings. Notably, the second set of stator windings 120 are distinct from the first set of stator windings 110.

Further, the windings 110, 120 may be of copper wire. However, other materials are possible and contemplated. Thus, phases 1, 2, and 3 belong to the same star S1 and are 120 electrical degrees shifted. Further, this same electrical shift is applied to phases 4, 5, and 6 which belong to another star S2. Thus, the first set 110 of stator windings may be in a star configuration and the second set 120 of stator windings may be in the star configuration.

It is noted that this co-locating of windings in the slots of the stator 206 as shown in FIGS. 2B-5B is in contrast to the layout of the windings in the slots of the stator 206 of FIG. 2A. Notably, as compared to the stator 206 of FIG. 2A, the stator 206 of FIGS. 2B-5B have three additional co-located windings, thereby resulting in a 6-phase homologous generator.

As seen in FIGS. 3A-3B, windings 110, 120 may share a same slot (i.e., slot 1 or slot 2 or slot 48, etc.). For example, winding 312 may be located on an outer, upper (radial) portion of slot 36 while winding 314 may be located on an inner, lower (radial) portion of slot 36. In this way, winding 312 and winding 314 are co-located within the same slot of the stator 206. This may be seen in FIGS. 4A-4B, 5A-5B at 400A, 400B, 500A, 500B with windings 322, 324 of slot 35 and windings 422, 424 of slot 38.

According to one aspect, windings of the first subset 112 of the first set 110 of stator windings can be located in radially outer portions of the plurality of slots of the stator 206. According another aspect, windings of the first subset 122 of the second set 120 of stator windings may be located in radially outer portions of the plurality of slots of the stator 206. According to one aspect, windings of the first subset 112 of the first set 110 of stator windings may be disposed in radially inner portions of the plurality of slots of the stator 206. According to another aspect, windings of the first subset 122 of the second set 120 of stator windings may be disposed in radially inner portions of the plurality of slots of the stator 206.

As will be appreciated, to be radially outward means that a straight line distance between the radially outward winding and the rotational axis 203 of the shaft 202 is greater than a straight line distance between the radially inward winding and the rotational axis 203 of the shaft 202. Stated another way, to be radially inward means that a straight line distance between the radially inward winding and the rotational axis 203 of the shaft 202 is less than a straight line distance between the radially outward winding and the rotational axis 203 of the shaft 202. Further, the radially outward winding and the radially inward winding can be radially aligned with the rotational axis 203 of the shaft 202 so as to all be disposed on a common imaginary line extending from the rotational axis 203. Along this line, the radially inward winding would be disposed between the radially outward winding and the rotational axis 203.

In this way, different sets of windings may share positive bridges, negative bridges, voltages, phases, flux, slots, etc. According to one aspect, the weight of the VFG may be optimized because when one side (i.e., the positive or the negative) draws lift current, the other size draws more current and vice versa. The configuration of the VFG described herein enables a reduction in total harmonic distortion and a reduction in the weight and/or size of the stator 206.

Voltage may be supplied to the co-located windings. One winding goes to the positive, the other goes to the negative side. From the perspective of the current being distributed from the DC link +/−, when the maximum current is going from the DC plus, much less current is taken from DC minus link and vice versa. When the maximum current is taken from DC minus link, it's much less the maximum from DC link plus.

Because the VFG 102 may be designed based on the magnetics associated with this configuration, the size of the stator 206 may take the maximum possible flux at any given time. When co-locating the windings as one, when it is taking the maximum, the other is not, the configuration provided herein may optimize the windings to be much smaller than when no co-location is done within the winding when taking both to the max current. If the windings are not co-located, the stator 206 would be designed in such way that it can provide a max current from both DC links, and likely require a larger size.

The 6-phase machine with co-located windings has two sets of three-phase windings. As can be seen from FIGS. 3A-3B through 5A-5B, phases 1, 2, and 3, belonging to the same star S1, are 120 electrical degrees shifted. The same electrical shift is applied to phase from 4 through 6, belonging to another star S2.

The three additional windings (phase 4, 5, and 6) may be located in the same slots of the corresponding phases belonging to S1 (FIGS. 3A-3B through 5A-5B). The current injected in the windings sharing the same slots flows in the opposite direction (or phase), thus producing a positive and a negative contribution to the flux. However, the two opposite contributions of current to the flux are only due the extra modulation of the current. An example of the injected currents may be performed at 600 Hz. Those correspond to the electrical frequency of the current of the machine running at 18000 rpm.

An extra modulation of the current with 1200 Hz can be utilized. Thus, current of the windings associated with the first subset 112 of the first set 110 of stator windings and windings associated with the first subset 122 of the second set 120 of stator windings may flow with a first phase shift and current of the windings associated with the second subset 114 of the first set 110 of stator windings and windings associated with the second subset 124 of the second set 120 of stator windings may flow with a second phase shift that is different than the first phase shift.

The flux linking each phase directly reflects the effects of the co-located windings carrying the opposite current. Each phase may produce a sine wave flux where the harmonic effects are compensating each other between the co-located windings (i.e., Phase 1 to Phase 4, Phase 2 to Phase 5, and Phase 3 to Phase 6). One advantage in the herein described windings and associated machine behavior is a clear reduction of the harmonic content of the torque and the torque ripple.

Figure 6A:
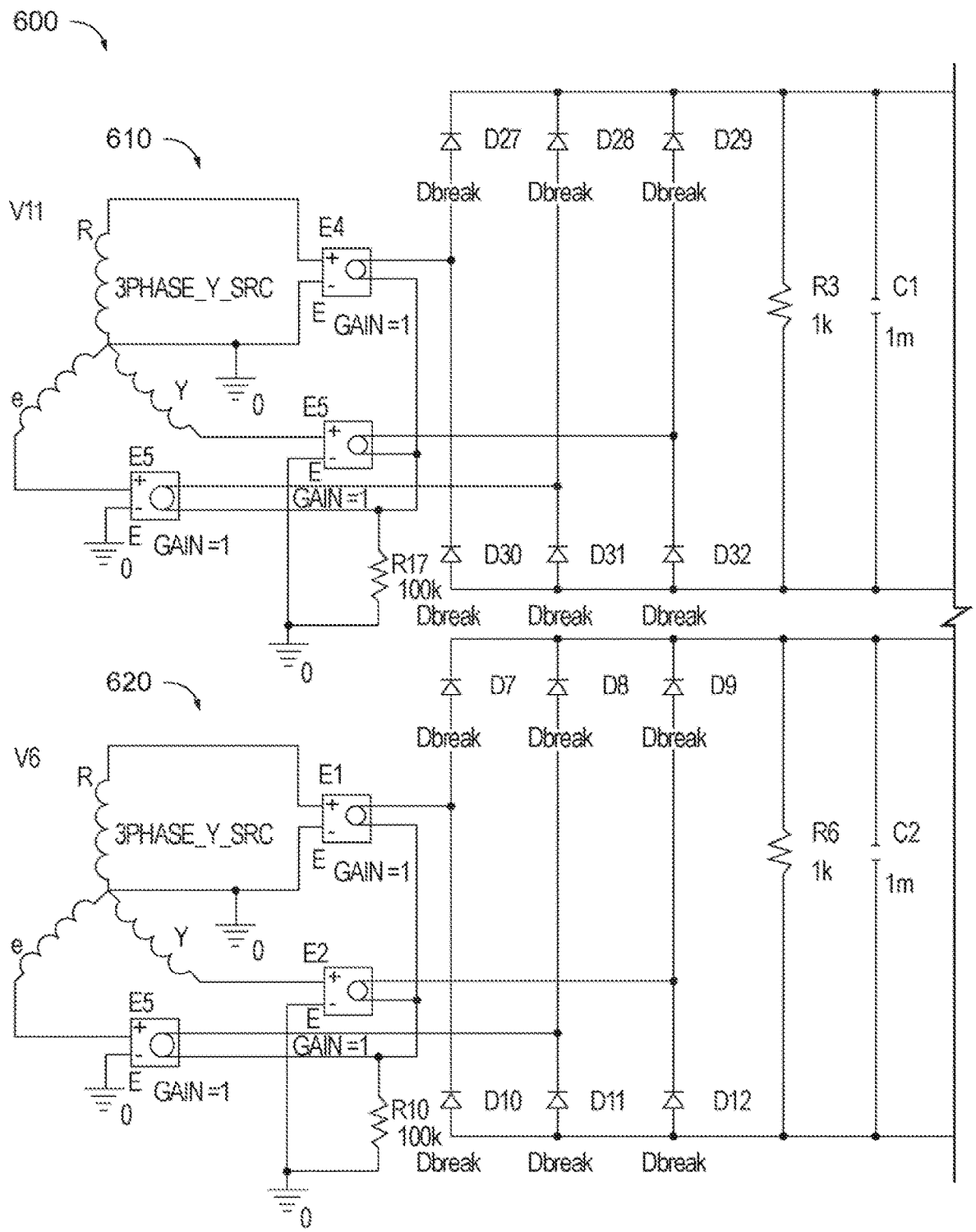
FIG. 6A-6B is an exemplary circuit diagram of a variable frequency generator (VFG), according to one aspect.
Figure 6B:
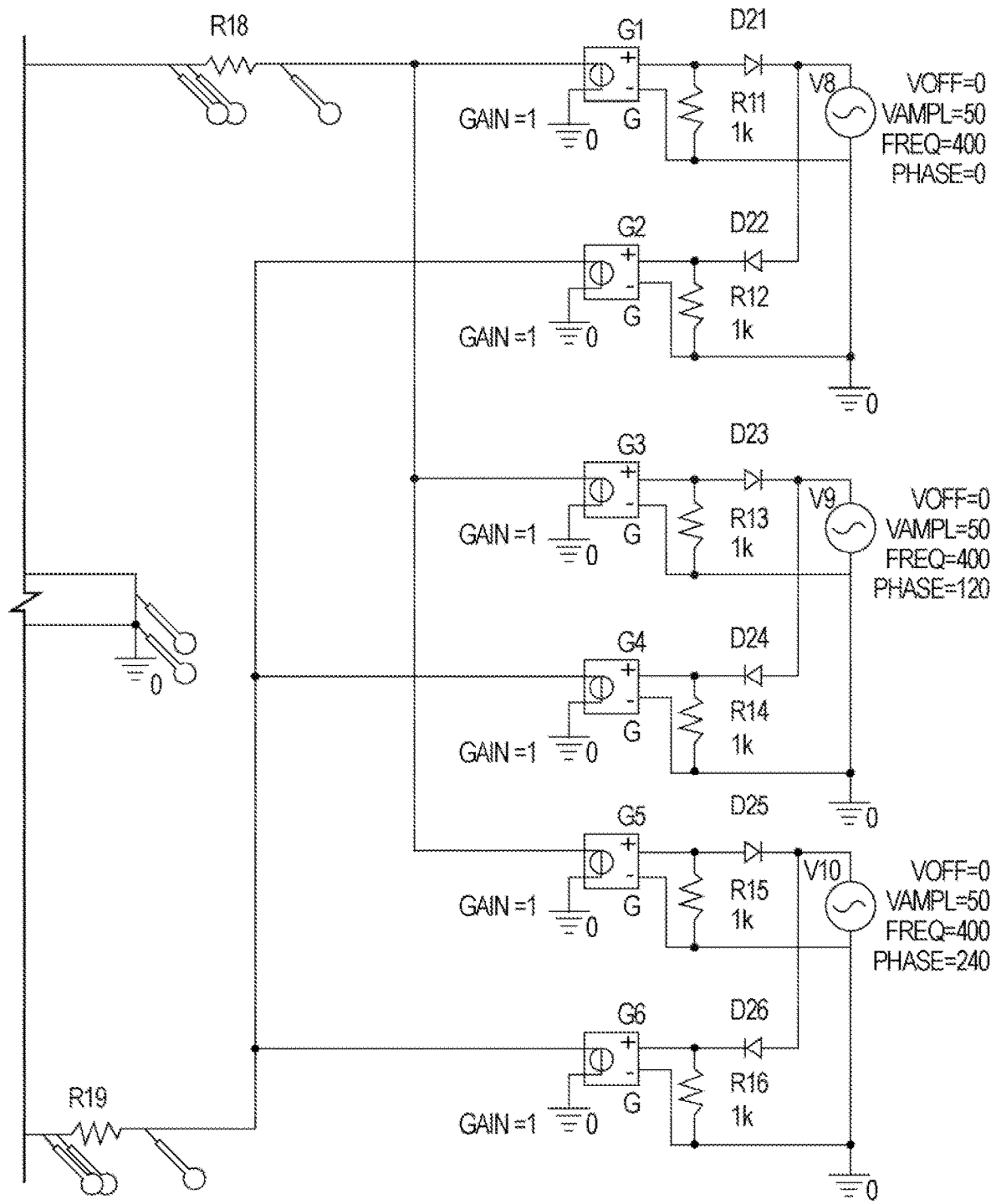

FIG. 6A-6B is an exemplary circuit diagram of a variable frequency generator (VFG) 600, according to one aspect. The first set of windings 610 and the second set of windings 620 may be co-located in the manner seen in FIGS. 3A-3B through 5A-5B.

Winding generator stators 206 in this co-located fashion may decrease harmonic content and increase efficiency. As explained above, the DC voltage ripple can be reduced using the co-located voltage. A shift in applied between the windings of the two stars enables a further reduction in the voltage ripple to be achieved.

For example, an output ripple of about 5V when the co-located phase windings are in phase with each other may occur. By shifting the phase of one of the groups of co-located phase windings by 90 electrical degrees, substantially less output voltage ripple, such as around 1V, may be achieved. A 90 electrical degree phase shift may produce an optimal reduction in harmonic content. Thus, a phase of the first set 110 of stator windings may be shifted by at least 90 electrical degrees. Other beneficial effects of shifting the currents can be observed in the torque harmonics and torque ripple.

By injecting the current signals 14, 15, 16 in the next two consecutive slots, first, and then four consecutive slots, these two operations may correspond to a physical shift of the windings of phase 4, 5, 6 of 60 degrees and 120 degrees, respectively, as each slot span is equal to 30 mechanical degrees. Shifting the co-located winding thus has a positive impact on the torque harmonics and the torque ripple. A 120 degree shift may represents a solution as the torque produced by the machine is roughly the same as the tri-phase reference machine however the torque ripple is reduce by almost 50% with respect to the traditional machine.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A variable frequency generator, comprising:
a housing;
a shaft rotationally received in the housing, the shaft defining a rotational axis;
a rotor disposed on the shaft so as to be rotationally linked to the shaft;
a stator located in the housing so as to at least partially surround the rotor and remain stationary with respect to the housing, the stator defining a plurality of slots that are radially aligned with the rotational axis of the shaft;
a first set of stator windings including a first subset of windings in a first configuration and having a first common point of connection and a second subset of windings in a second configuration having a second common point of connection different from the first common point of connection; and
a second set of stator windings including a first subset of windings in a third configuration and having a third common point of connection and a second subset of windings in a fourth configuration having a fourth common point of connection different from the third common point of connection, the second set of stator windings being distinct from the first set of stator windings, the first configuration not including windings from the second configuration and the third configuration not including windings from the fourth configuration;
wherein:
at least some of the windings of the first subset of the first set of stator windings are co-located with at least some of the windings of the first subset of the second set of stator windings so as to share a common slot of the plurality of slots of the stator, and
at least some of the windings of the second subset of the first set of stator windings are co-located with at least some of the windings of the second subset of the second set of stator windings so as to share a common alternative slot of the plurality of slots of the stator; and the first common point of connection is connected to the third common point of connection and the second common point of connection is connected to the fourth common point of connection, the first common point of connection does not share a connection to the second common point of connection.

2. The variable frequency generator of claim 1,
wherein current of the windings of the first subset of the first set of stator windings and the windings of the first subset of the second set of stator windings flow with a first phase shift;
wherein current of the windings of the second subset of the first set of stator windings and the windings of the second subset of the second set of stator windings flows with a second phase shift, and wherein the second phase shift is different than the first phase shift.

3. The variable frequency generator of claim 1, wherein the first set of stator windings is a set of three-phase windings and the second set of stator windings is a second set of three-phase windings.

4. The variable frequency generator of claim 1, wherein the first configuration, the second configuration, the third configuration, and the fourth configuration are star configurations.

5. The variable frequency generator of claim 1, wherein at least some of the windings of the first subset of the first set of stator windings are disposed in radially outer portions of the plurality of slots of the stator.

6. The variable frequency generator of claim 5, wherein at least some of the windings of the first subset of the second set of stator windings are disposed in radially inner portions of the plurality of slots of the stator with respect to the windings of the first subset of the first set of stator windings.

7. The variable frequency generator of claim 1, wherein a phase of the first set of stator windings is shifted by at least 90 electrical degrees.

8. A variable frequency generator, comprising:
a housing;
a shaft rotationally received in the housing, the shaft defining a rotational axis;
a rotor disposed on the shaft so as to be rotationally linked to the shaft;
a stator at least partially surrounding the shaft and defining a plurality of slots;
a first set of stator windings including a first subset in a first configuration and having a first common point of connection and a second subset in a second configuration having a second common point of connection different from the first common point of connection; and
a second set of stator windings including a first subset in a third configuration and having a third common point of connection and a second subset in a fourth configuration having a fourth common point of connection different from the third common point of connection,
wherein:
the windings of the first subset of the first set of stator windings share a common slot of the plurality of slots of the stator with the windings of the first subset of the second set of stator windings;
the windings of the second subset of the first set of stator windings share a common alternative slot of the plurality of slots of the stator with the windings of the second subset of the second set of stator windings;
current of the windings of the first subset of the first set of stator windings and the windings of the first subset of the second set of stator windings flows with a first phase shift; and
current of the windings of the second subset of the first set of stator windings and the windings of the second subset of the second set of stator windings flows with a second phase shift, and wherein the second phase shift is different from the first phase shift; and
the first common point of connection is connected to the third common point of connection and the second common point of connection is connected to the fourth common point of connection, the first common point of connection does not share a connection to the second common point of connection.

9. The variable frequency generator of claim 8, wherein the first set of stator windings is a set of three-phase windings and the second set of stator windings is a second set of three-phase windings.

10. The variable frequency generator of claim 8, wherein the first configuration, the second configuration, the third configuration, and the fourth configuration are star configurations.

11. The variable frequency generator of claim 8, wherein the windings of the first subset of the first set of stator windings are disposed in radially outer portions of the plurality of slots of the stator.

12. The variable frequency generator of claim 11, wherein the windings of the first subset of the second set of stator windings are disposed in radially inner portions of the plurality of slots of the stator with respect to the windings of the first subset of the first set of stator windings.

13. The variable frequency generator of claim 8, wherein a phase of the first set of stator windings is shifted by at least 90 electrical degrees.

14. A variable frequency generator, comprising:
a housing;
a shaft rotationally received in the housing, the shaft defining a rotational axis;
a rotor disposed on the shaft;
a stator located in the housing so as to at least partially surround the rotor, the stator defining a plurality of slots;
a first set of stator windings including a first subset in a first configuration and having a first common point of connection and a second subset in a second configuration having a second common point of connection different from the first common point of connection; and
a second set of stator windings including a first subset in a third configuration and having a third common point of connection and a second subset in a fourth configuration having a fourth common point of connection different from the third common point of connection;
wherein:
the windings of the first subset of the first set of stator windings share common slots of the plurality of slot of the stator with the windings of the first subset of the second set of stator windings;
the windings of the second subset of the first set of stator windings share common alternative slots with the windings of the second subset of the second set of stator windings;
the windings of the first subset of the first set of stator windings are disposed in radially outer portions of the plurality of slots of the stator with respect to the windings of the first subset of the first set of stator windings; and the first common point of connection is connected to the third common point of connection and the second common point of connection is connected to the fourth common point of connection, the first common point of connection does not share a connection to the second common point of connection.

15. The variable frequency generator of claim 14, wherein current of the windings of the first subset of the first set of stator windings and the windings of the first subset of the second set of stator windings flows with a first phase shift;

wherein current of the windings of the second subset of the first set of stator windings and the windings of the second subset of the second set of stator windings flows with a second phase shift, and wherein the second phase shift is different than the first phase shift.

16. The variable frequency generator of claim 14, wherein the first set of stator windings is a set of three-phase windings and the second set of stator windings is a set of three-phase windings.

17. The variable frequency generator of claim 14, wherein the first configuration, the second configuration, the third configuration, and the fourth configuration are star configurations.

18. The variable frequency generator of claim 14, wherein the windings of the first subset of the second set of stator windings are disposed in radially outer portions of the plurality of slots of the stator.

19. The variable frequency generator of claim 18, wherein the windings of the first subset of the second set of stator windings are radially disposed in inner portions of the plurality of slots of the stator with respect to the windings of the first subset of the first set of stator windings.

20. The variable frequency generator of claim 14, wherein a phase of the first set of stator windings is shifted by at least 90 electrical degrees.

* * * * *